May 22, 1956        C. E. WIGGINS        2,746,665
FEED BOX
Filed April 6, 1950
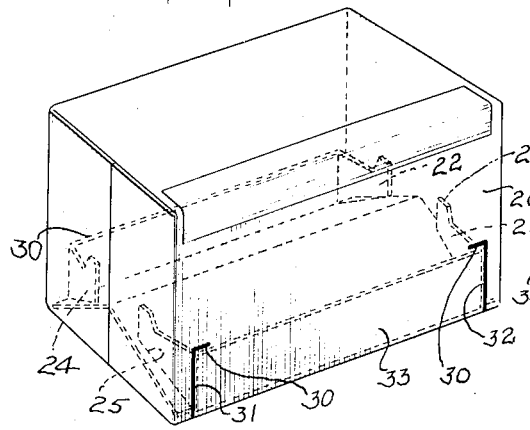
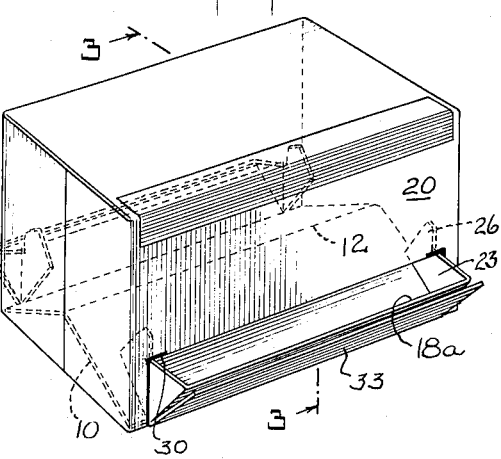
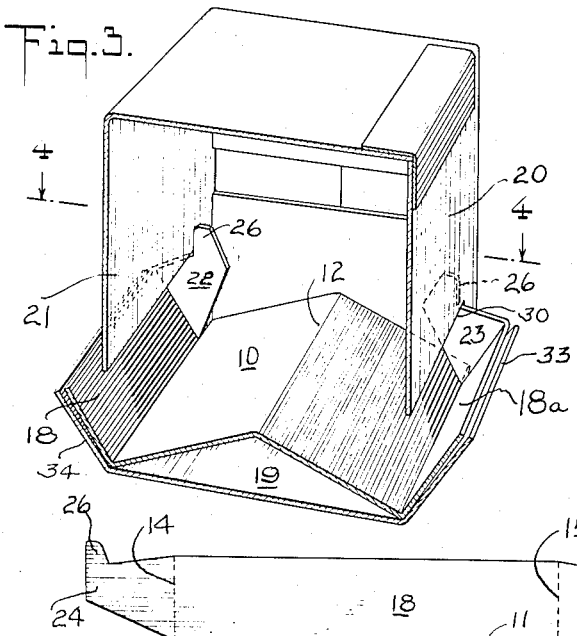
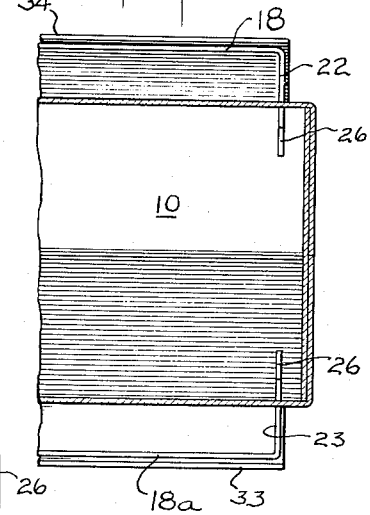
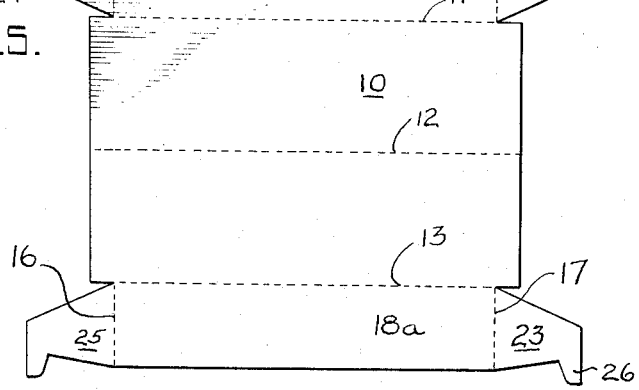
INVENTOR
C. E. Wiggins
BY
A. H. Golden
ATTORNEY United States Patent Office 2,746,665
Patented May 22, 1956

2,746,665

FEED BOX

Clyde E. Wiggins, Winter Garden, Fla., assignor, by mesne assignments, to Stone Mountain Grit Company, Inc., a corporation of Georgia Application April 6, 1950, Serial No. 154,346

8 Claims. (Cl. 229—7)

This invention relates to a feed box for poultry or the like. More particularly, the box of my invention is adapted for the packaging therein of material such as poultry feed, this feed to be made accessible to poultry by the cutting of the box along predetermined lines.

While boxes of the particular class are well known in the art, they generally have been quite costly to manufacture, and also difficult to assemble and manipulate into poultry feeding position. My invention contributes to the art an extremely simple box having an extremely simple insert, the mere cutting of the box along predetermined lines allowing the formation of feed troughs from which the feed material of the box flows in a controlled manner for access to poultry.

As one feature of my invention whereby the objects thereof are attained, I utilize a box having sides adapted for slitting along predetermined lines whereby to form flaps. Co-acting with these flaps are parts of an insert maintained within the box in a predetermined position, the insert acting to control the quantity of feed made available through the openings in the box created by the slitting thereof. As a further feature of this part of the invention, the controlling parts of the insert, which I shall call containing flaps, are maintained against full outward movement, the means for this purpose being preferably integral parts of the flaps.

As a further particular feature of the invention, the insert is formed so that part of its is in section an inverted V, whereby the grains of the feed roll downwardly toward the trough created by the movement of the container flaps outwardly, the container flaps being extensions of the legs of the V. As a further particular feature of the invention, the entire insert may take such form that its section is a W resting on the bottom of the feed box with the outer arms of the W pressing against the surfaces of the sides of the box that are pivoted outwardly after the slitting of the box as heretofore set forth.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a perspective view of the box of my invention before it is cut, the insert being shown in dotted lines. Fig. 2 is a view of the box of Fig. 1 after the box has been cut and the box flaps and containing flaps have been moved outwardly. Fig. 3 is a section taken along lines 3—3 of Fig. 2. Fig. 4 is a section taken along lines 4—4 of Fig. 3. Fig. 5 is a plan view of the insert used in the box of my invention.

Referring now more particularly to the drawings, the of my invention may be formed of cardboard of any particular type having the usual bottom, side and end surfaces. The box may be assembled in any desired manner and may be glued so as to take the form shown in Figs. 1 and 2. Within the box there is placed an insert shown in plan view in Fig. 5 and there designated by reference numeral 10. The insert is formed with folding lines 11, 12, 13, 14, 15, 16 and 17. When placed in the box, the insert is bent along line 12 to form at its center an inverted V in section as shown in Fig. 3. The insert is further bent along lines 11 and 13 to form container flaps 17 and 18, the edge material of the insert along said lines 11 and 13 then lying against the bottom 19 of the box and more particularly in the corners between the bottom 19 and the sides 20 and 21 of the feed box. By folding the insert along lines 14, 15, 16 and 17, a series of wings 22, 23, 24, and 25 are formed, these wings extending inwardly of the box as is particularly well illustrated in Fig. 1. Each wing is formed with a detent portion 26, the purpose of which will appear presently.

The two opposing sides of the box, designated by reference numerals 20 and 21, have impressed thereon scored lines 30 that are preferably horizontal and parallel to the bottom edges. Extending downwardly from the lines 30 are vertical lines 31, 32, terminating at the bottom edges of the box. It will readily be appreciated that if a knife is used to cut each side 20, 21 along the lines 31 and 32, there will be created box flaps 33 and 34 adapted then to move outwardly to the positions illustrated in Figs. 2 and 3. When the box flap 33, as an example, moves outwardly, the container flap portion 18 will also pivot outwardly to the position illustrated in Figs. 2 and 3, and it is a fact that the feed container flap 18 will actually tend to move in that particular direction because of its being pre-stressed through bending along line 13. Outward movement of the container flap 18 will of course be limited by the detent portions of the wings 23 and 25. Moreover, the wings 23 and 25 will form end-containing surfaces for the trough outlined by container flap 18 and one of the downwardly-extending surfaces of the inverted V of the insert 10.

It will of course be appreciated that the container flap 17 will function similarly to develop a trough at the other side of the box, thereby creating two troughs, one at each side of the box, from which the poultry may take feed. This feed will be initially packed in the box and will rest on the inverted V surfaces in position to flow into the troughs formed as in Figs. 2 and 3 by the flaps. Moreover, the inverted V surfaces will function continuously to move the feed within the box into the troughs until all the feed has been consumed. It will be appreciated further that the lower edges of the box sides defined by the lines 30, 31 will measure the amount of feed moving into the troughs and will prevent an undue amount of feed from moving outwardly of the box.

It will now be appreciated by those skilled in the art that through the utilization of the W-shaped insert forming an inverted V relatively to the bottom of a box, I am able to feed grain continuously into a pair of opposed troughs, these troughs being readily formed through coaction of the insert with the box sides as those sides are cut and opened. It will further be appreciated that the amount of feed moved into the troughs is controlled and limited by portions of the insert. I believe that the merits of my invention will now be understood by those skilled in the art.

I claim:

1. In a feed box of the class described, a pair of opposed side walls the lower portions of which are adapted for cutting along a longitudinal line and then downwardly vertically from the ends of said line inwardly of the opposed ends of said side walls to a folding line for creating a box flap pivoting outwardly from each wall along said folding line, a filler for said box having a containing flap resting against each of said box flaps for pivotal movement with said box flaps outwardly relatively to said box walls on a line substantially coincidental with said folding lines, means limiting said pivotal movement of said containing flaps whereby to contain feed in said box, and portions of said filler integral with said containing flaps forming a false bottom for said box for the full length thereof and slanting downwardly in said feed box toward said folding lines at each side of said containing flaps to create a trough.

2. In a feed box of the class described, a pair of opposed side walls the lower portions of which are adapted for cutting along a longitudinal line and then downwardly vertically from the ends of said line inwardly of the opposed ends of said side walls to a folding line for creating a box flap pivoting outwardly from each wall along said folding line, a filler for said box formed as an inverted V relatively to the entire bottom of said box with container flaps extending upwardly from the ends of the arms of said inverted V to rest against each of said box flaps for pivotal movement with said box flaps outwardly relatively to said side walls, said container flaps being shorter than said box sides and substantially coextensive with said box flaps, and means limiting said pivotal movement of said containing flaps whereby to contain feed in said box.

3. In a feed box of the class described, a pair of opposed side walls the lower portions of which are adapted for cutting along a pair of parallel vertical lines and a horizontal line for creating a box flap pivoting outwardly from each wall along a lower line parallel to said horizontal line and running between the lower ends of said vertical lines, said vertical lines being inward of the ends of said side walls, a filler for said box having an inverted V-bottom overlying the entire bottom of said box and formed with a container flap substantially coextensive with and resting against each of said box flaps for pivotal movement with said box flaps outwardly relatively to said box walls on a line substantially coincidental with said lower line of said box flaps, a wing surface at each end of each container flap and bent inwardly of said box, said wing surfaces forming with said container flaps and V-bottom troughs for feed in said box when said container flaps pivot outwardly with the box flaps with which they coact.

4. In a feed box of the class described, a pair of opposed side walls the lower portions of which are adapted for cutting along a longitudinal line terminating short of the ends of said side walls and then downwardly vertically from the ends of said line to a folding line at the bottom of each wall for creating a box flap pivoting outwardly from each wall along said folding line, a filler for said box formed as an inverted V relatively to the entire bottom of said box with container flaps extending upwardly from the ends of the arms of said inverted V coextensive in length with said box flaps to rest against each of said box flaps for pivotal movement with said box flaps outwardly relatively to said side walls, a wing surface at each end of each container flap and bent inwardly of said box, said wing surfaces forming with each container flap and said inverted V-bottom a trough for feed in said box when said container flaps pivot outwardly with the box flaps with which they coact.

5. In a feed box of the class described, side walls extending upwardly from a bottom, said side walls being adapted for cutting along a longitudinal line terminating short of each end of each side wall and spaced from its bottom and then downwardly from each end of said line to the bottom for creating a box flap pivoting outwardly from each wall along the bottom edge thereof, an inverted V filler overlying the entire bottom of said box and having an arm coextensive with and resting against each box flap for pivotal movement with said box flap outwardly relatively to said side wall to form a container flap.

6. In a feed box of the class described, a pair of opposed side walls extending upwardly from a bottom, each side wall being adapted for cutting along a longitudinal line terminating short of each end of said side wall and spaced from its bottom and then downwardly from each end of said line to the bottom for creating a box flap pivoting outwardly from each wall along the bottom edge thereof, and a W-shaped filler having its inverted V portion overlying the entire bottom of said box with the outer arms of the W substantially coextensive with and resting against the box flaps for pivotal movement with said box flaps outwardly relatively to said side walls to form container flaps.

7. In a feed box of the class described, a pair of opposed side walls extending upwardly from a bottom, each side wall being adapted for cutting along a longitudinal line terminating short of each end of said side wall and spaced from its bottom and then downwardly from each end of said line to the bottom for creating a box flap pivoting outwardly from each wall along the bottom edge thereof, a W-shaped filler having its inverted V portion overlying the entire bottom of said box with the outer arms of the W substantially coextensive with and resting against the box flaps for pivotal movement with said box flaps outwardly relatively to said side walls to form container flaps, a wing surface at each end of each container flap bent inwardly of said box, and detent portions on said wing surfaces coacting with said box to limit pivotal movement of said container flaps outwardly relatively to said box.

8. A convertible shipping carton and self-feeder comprising four side walls, a top and a bottom, a self-feeder false bottom insert snugly fitting within said carton between two opposite side walls and having opposite edge portions thereof seating on the bottom, the false bottom including panels sloping downwardly on opposite sides from a longitudinally extending ridge to the carton bottom at opposite side walls, flaps extending upwardly from the outer edges of said panels and seating against said opposite side walls, the flaps having end flanges extending inwardly of said carton, said two first mentioned opposite side walls being adapted to be cut along said flaps to provide openings opposite the latter, and the said flaps being constructed and arranged to be swung outwardly through said openings at an upwardly and outwardly inclined angle to provide feed troughs outside of said two first mentioned opposite side walls.

References Cited in the file of this patent

UNITED STATES PATENTS

| Number | Name | Date |
|---|---|---|
| 934,287 | Cramer | Sept. 14, 1909 |
| 1,000,624 | Pexton | Aug. 15, 1911 |
| 1,460,226 | Collis | June 26, 1923 |
| 1,645,771 | Pillsbury | Oct. 18, 1927 |
| 1,916,230 | Murray | July 4, 1933 |
| 2,556,707 | Rendall | June 12, 1951 |
| 2,627,972 | Roos | Feb. 10, 1953 |